United States Patent
Franchi et al.

(10) Patent No.: US 10,409,588 B2
(45) Date of Patent: Sep. 10, 2019

(54) METHOD FOR MANAGING OBJECTS IN A SECURE ELEMENT

(71) Applicant: GEMALTO SA, Meudon (FR)

(72) Inventors: Christophe Franchi, Gemenos (FR); François-Xavier Marseille, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 0 days.

(21) Appl. No.: 16/074,840

(22) PCT Filed: Jan. 27, 2017

(86) PCT No.: PCT/EP2017/051855
§ 371 (c)(1),
(2) Date: Aug. 2, 2018

(87) PCT Pub. No.: WO2017/140476
PCT Pub. Date: Aug. 24, 2017

(65) Prior Publication Data
US 2019/0034186 A1    Jan. 31, 2019

(30) Foreign Application Priority Data
Feb. 17, 2016  (EP) .................................... 16305179

(51) Int. Cl.
*G06F 9/445*  (2018.01)
*G06F 21/57* (2013.01)
(Continued)

(52) U.S. Cl.
CPC .................. *G06F 8/65* (2013.01); *G06F 8/61* (2013.01); *G06F 9/4451* (2013.01); *G06F 9/44521* (2013.01); *G06F 21/51* (2013.01)

(58) Field of Classification Search
CPC .......... G06F 8/65; G06F 8/61; G06F 9/44521; G06F 21/51
See application file for complete search history.

(56) References Cited

U.S. PATENT DOCUMENTS 8,151,345 B1 *  4/2012  Yeager ................. G06Q 20/367
                                                          235/375
9,483,249 B2 * 11/2016  Khan ........................ G06F 8/65
(Continued)

FOREIGN PATENT DOCUMENTS

EP          2827275 A1     1/2015

OTHER PUBLICATIONS

Michael Holzl et al., Mobile Application to Java Card Applet communication using a Password-authenticated Secure Channel, Dec. 8-10, 2014, [Retrieved on Mar. 27, 2019]. Retrieved from the internet: <URL: http://delivery.acm.org/10.1145/2690000/2684128/p147-hoelzl.pdf?> 10 Pages (1-10) (Year: 2014).*
(Continued)

*Primary Examiner* — Anibal Rivera
(74) *Attorney, Agent, or Firm* — Buchanan Ingersoll & Rooney PC

(57) ABSTRACT

The invention is a method of managing an object which is represented by a first instance of a class. The first instance is stored in a secure element comprising an initial operating system. The method comprises a step of updating the initial operating system to generate an updated operating system, a step of creating a metadata uniquely associated with the object, said metadata being permanently stored in the secure element and comprising a value of a parameter of said class which has been used to create said first instance. The method comprises a step of re-instantiating the object by generating an updated instance of the class in the updated operating system by using said value to set said parameter of the class, said updated instance representing the object. The re-instan-
(Continued)

tiating step is automatically triggered by the step of updating the initial operating system.

5 Claims, 2 Drawing Sheets

(51) Int. Cl.
*G06F 8/65* (2018.01)
*G06F 8/61* (2018.01)
*G06F 21/51* (2013.01)

(56) References Cited

U.S. PATENT DOCUMENTS

| | | | | |
|---|---|---|---|---|
| 2003/0028686 | A1* | 2/2003 | Schwabe | G06F 9/44521 719/332 |
| 2007/0277168 | A1 | 11/2007 | Vetillard | |
| 2014/0025940 | A1* | 1/2014 | Giraud | G06F 21/51 713/2 |
| 2014/0058937 | A1* | 2/2014 | Watson | G06Q 20/204 705/41 |
| 2015/0106456 | A1* | 4/2015 | van Hoek | H04W 4/12 709/206 |
| 2015/0193221 | A1* | 7/2015 | Khan | G06F 8/65 713/176 |
| 2015/0193224 | A1* | 7/2015 | Ziat | G06F 8/65 717/172 |
| 2016/0054989 | A1* | 2/2016 | Diebolt | G06F 8/61 717/177 |
| 2016/0171207 | A1 | 6/2016 | Chen et al. | |

OTHER PUBLICATIONS

Michael Roland et al., Practical Attack Scenarios on Secure Element-enabled Mobile Devices, 2012 IEEE, [Retrieved on Mar. 27, 2019]. Retrieved from the internet: <URL: https://ieeexplore.ieee.org/stamp/stamp.jsp?tp=&arnumber=6176329> 6 Pages (19-24) Year: 2012).*

International Search Report (PCT/ISA/210) dated Mar. 3, 2017, by the European Patent Office as the International Searching Authority for International Application No. PCT/EP2017/051855.

Written Opinion (PCT/ISA/237) dated Mar. 3, 2017, by the European Patent Office as the International Searching Authority for International Application No. PCT/EP2017/051855.

Orso, Alessandro , et al. , "A Technique for Dynamic Updating of Java Software", Proceedings of the International Conference on Software Maintenance, 2002, 10 pages.

* cited by examiner

METHOD FOR MANAGING OBJECTS IN A SECURE ELEMENT

RELATED APPLICATIONS

This application is a national stage entry of international application PCT/EP2017/051855, filed Jan. 27, 2017, which claims priority to European Application EP 16305179.0, filed Feb. 17, 2016, each of which is incorporated by reference herein.

FIELD OF THE INVENTION

The present invention relates to methods of managing objects in a secure element. It relates particularly to methods of managing objects which are represented by instance of class in a secure element when the operating system of the secure element is updated.

BACKGROUND OF THE INVENTION

Secure elements are small devices comprising a memory, a microprocessor and an operating system for computing treatments. Such secure elements may comprise a plurality of memories of different types, like non-volatile memory and volatile memory. They are called "secure" because they are able to control the access to the data they contain and to authorize or not the use of data by other machines. The secure elements may also provide computation services based on cryptographic components. In general, secure elements have limited computing resources and limited memory resources and they are intended to be connected to a host machine which provides them with electric power. Secure elements may be removable or fixed to a host machine. For example, smart cards are a kind of secure elements.

A secure element may contain applications and their associated applicative data which encompass user data, file systems and secret key. Such an application may be developed as a package or a set of packages which is stored into the secure element. One or several instances of the application are then created as needed. Each instance owns, handles and store its own instance data.

Secure elements may be accessed by a remote server via a wireless channel or through a wired network, like Internet for instance. For example, secure elements which are intended to be used in Telecom domain or Machine-To-Machine (M2M) domain are able to manage an OTA (Over-The-Air) channel. These secure elements may also be accessed through the HyperText Transfer Protocol, usually called HTTP or HTTPS for the secure mode. Thus, a distant server can remotely manage the content of a secure element like an UICC (Universal Integrated Circuit Card) through a dedicated communication session using a specific protocol. For example, the server may use the RAM (Remote Applet Management) mechanism as defined by GlobalPlatform® v 2.2 standard—Amendment B "RAM over HTTP" or the OMA-DM (Open Mobile Alliance—Device Management) protocol as defined by OMA-TS-DM V1.2.1 standard.

According to JavaCard™ specifications, a package may be loaded in a secure element through a CAP file. The package generally comprises several classes. When an application is installed from the package, an instance of a class is created. This instance corresponds to an object.

JavaCard™ objects are not created each time a JavaCard™ OS or a JavaCard™ applet is started. They are created once (for example when a JavaCard™ applet is installed, personalized, etc.) and then become persistent, except if deleted, for the rest of the life of the JavaCard™ OS or the JavaCard™ applet. A remote server can send a new version or an upgrade of the operating system of the secure element. In this case, the existing objects (e.g. existing instances of class) must be re-instantiated when the operating system has been updated. In other words, new instances of class corresponding to the old ones must be instantiated in the new operating system context in order to re-create the previously existing objects. This instantiation is carried out from the packages stored in the secure element. It is to be noted that old class instances are no more used or even deleted and their content is lost in the new operating system context.

The re-instantiation of object from a package may require time and a large part of the available computing resources of the secure element. This problem is exacerbated when a large number of objects (i.e. class instances) must be re-created in a secure element. Moreover, the remote server may have no access to the relevant package if this package has been installed by another entity like a third party.

There is a need for allowing to maintain existing objects in a functional state when the operating system of a secure element is updated.

SUMMARY OF THE INVENTION

An object of the invention is to solve the above mentioned technical problem.

The object of the present invention is a method for managing an object which is represented by a first instance of a class. This first instance is stored in a secure element comprising an initial operating system. The method comprises a step of updating the initial operating system to generate an updated operating system. The method comprises the step of creating a metadata uniquely associated with the object, said metadata being permanently stored in the secure element and comprising a value of a parameter of said class which has been used to create said first instance. The method comprises the step of re-instantiating the object by generating an updated instance of the class in the updated operating system by using the value to set the parameter of the class, the updated instance representing the object. The re-instantiating step is automatically triggered by the step of updating the initial operating system.

Advantageously, the first instance may comprise a set of data which are dependent on the initial operating system. During the re-instantiating step said set of data may be deleted from the secure element and a new set of data which are dependent on the updated operating system may be created and allocated to the updated instance.

Advantageously, the first instance may comprise a group of data which are independent of the initial operating system and the data of the group may be kept unchanged and allocated to the updated instance.

Another object of the invention is a secure element comprising an initial operating system and an object which is represented by a first instance of a class. The secure element comprises an upgrading agent adapted to generate an updated operating system by updating the initial operating system. The secure element comprises a keeper agent adapted to create a metadata uniquely associated with the object and comprising a value of a parameter of the class which has been used to create said first instance. The keeper agent is adapted to permanently store the metadata in the secure element. The secure element comprises an instantiating agent adapted to re-instantiate the object by creating a second instance of the class in the updated operating system by using said value to set said parameter of the class. The upgrading agent is adapted to trigger the re-instantiating step at the end of the updating of the initial operating system.

Advantageously, the first instance may comprise a set of data which are dependent on the initial operating system. The instantiating agent may be adapted to delete the set of data from the secure element and to create a new set of data and to generate the updated instance during the re-instantiating step.

Advantageously, the first instance may comprise a group of data which are independent of the initial operating system and the instantiating agent may be adapted to allocate the data of said group to the updated instance while keeping said data of said group unchanged.

Advantageously, the keeper agent may be adapted to create and permanently store the metadata in a format different from that of the first instance.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any types of secure element intended to embed class instances and an operating system which may be upgraded when deployed on the field. Such secure elements may be coupled to a host machine like a smartphone, a smart watch, a vehicle, a meter, a slot machine, a TV or a computer.

In the present description, a package is a container as defined by object-oriented programming languages. In particular, the invention applies to objects as defined in Java™ and JavaCard™ languages.

Figure 1:
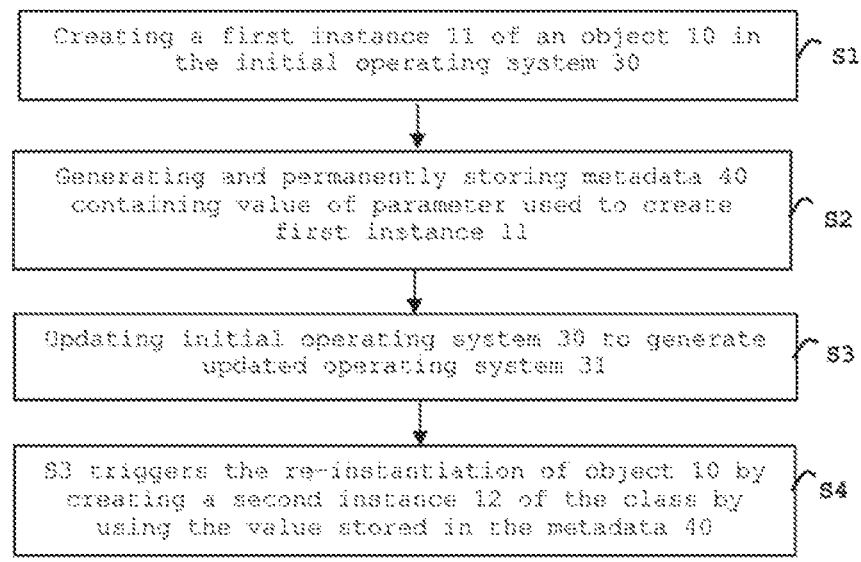
FIG. 1 shows an exemplary flow diagram of objects managing in a secure element according to the invention.

FIG. 1 shows an example of a flow diagram for managing an object when the operating system of a secure element is upgraded according to the invention.

A secure element 20 is supposed to have been issued with an original operating system 30. For example, this original operating system 30 may comprise an object-oriented virtual machine and high level Application programming Interfaces (APIs). For instance, the virtual machine (VM) may be compliant with JavaCard™ specifications version 2.2 or upper.

At step S1, a first instance 11 of a class is created in the secure element 10. This first class instance represents an object 10.

At step S2, a metadata 40 is generated and permanently stored in the secure element 20.

The class instance 11 is assumed to comprise two parts (i.e. two sets of data): a first part whose content is independent from the current operating system and a second part whose content is dependent of the current operating system.

Preferably, the metadata 40 is dynamically generated when the very first class instance is created. For example, the class constructor (i.e. the subroutine which is called to create an object) may be designed to generate and store the metadata 40 in addition to the creation of the class instance 11.

The metadata 40 contains a value of at least one parameter used to initialize the first class instance 11. In particular, the metadata 40 will be used to set the second part of the class instance to be initialized after the updating of the operating system of the secure element 20.

Let's consider a Cipher object, metadata associated may be embedded in a Cipher metadata object as follows:

```
Cipher_metadata {
    byte algorithm;
    boolean shared_access;
    byte encryption_mode;
    Key_metadata key;
}
Key_metadata {
    ...
}
```

Here is an example of structure of a Cipher object:

```
Cipher {
    Cipher_metadata metada;
    Key key;
    byte[ ] data;   // volatile data to cipher
    byte[ ] icv;   // volatile initial vector
}
Key {
    Key_metadata metadata;
    ...
}
```

The content of the metadata 40 is required to create the second part of a new class instance when the operating system has been updated.

The metadata 40 is permanently stored in the secure element 20. For instance, the metadata 40 may be stored in a non-volatile memory of the secure element 20. In the present description, "permanently stored" means that the metadata is kept in the secure element 20 for a long time. For example, these metadata is kept until the object 10 is removed from the secure element 20.

The metadata may be stored in a customized format which is different from the format of the class instance so as to minimize its footprint or to ease its parsing.

Although steps S1 and S2 have been described as two distinct steps they may be considered as a single step.

At step S3, an upgrade is applied to the original operating system 30 to generate a new (i.e. updated) operating system 31.

In a first example, the step S3 is carried out via a bootloader agent which is designed to administrate the current operating system of the secure element 20. In this case, the updated Operating system 31 is fully sent to the secure element 20.

In this case, the bootloader is activated so that the behavior of the secure element 20 does not rely on the original operating system 30. Then the new operating system 31 is downloaded in the secure element 20 via the bootloader. Then an activation command is sent to the secure element to switch from bootloader mode to the new operating system 31 mode and a further reset (i.e. hardware reboot) is applied to the secure element so that the secure element takes the new operating system 31 into account by starting the new operating system 31. In this example, the step S3 of updating the initial operating system 30 consists of the combination of execution of both the activation command and the reset.

In a second example, the step S3 may be carried out by downloading a bulk of data aiming at slightly modify the initial operating system (like a corrective patch or a new feature). In this case, the new/updated feature is active as soon as installed in the secure element (e.g. without requiring a reset). In this example, the step S3 of updating the initial operating system 30 consists of the installation of the new/updated feature.

It is to be noted that in all cases, the re-instantiation operation is performed when the updated operating system 31 is active on the secure element 20.

The end of the step S3 triggers the step S4 where a new instantiation (also named re-instantiation) operation of the object 10 is started in context of the updated operating system 31. This re-instantiation operation is carried out using the stored metadata 40.

In other words, the re-instantiation step is automatically triggered by the end of the step S3 and is carried out using data permanently stored in the secure element 20. Preferably, the re-instantiation step is executed as soon as the step S3 is finished (i.e. directly executed). Alternatively, other intermediate operations may occur between the end of the step S3 and the re-instantiation step.

Preferably, the metadata 40 which is permanently stored according to the invention, remains unchanged after the re-instantiation step so that a further re-instantiation step can be performed again after another operating system update.

Preferably, the re-instantiation operation of step S4 is carried out as follows.

First, the secure element 20 checks consistency (i.e. compatibility) of the metadata 40 with the updated operating system 31. This checking aims at controlling that the second part (i.e. the part whose content is dependent of the operating system) of the object 10 will be set with a value which is compliant with the features of the updated operating system 31.

In case of error, the re-instantiation operation may abort. Alternatively the re-instantiation operation may continue and existing objects which are not compatible with the new operating system 31 are removed or lost. In case of successful consistency checking, the secure element 20 create an instance 12 of the object 10 (i.e. a class instance) and initializes the content of the second part of the instance 12 by using the metadata 40.

It is to be noted that the object re-instantiation process is applied to all objects previously installed in the secure element provided that these objects are compatible with the updated operating system.

Figure 2:
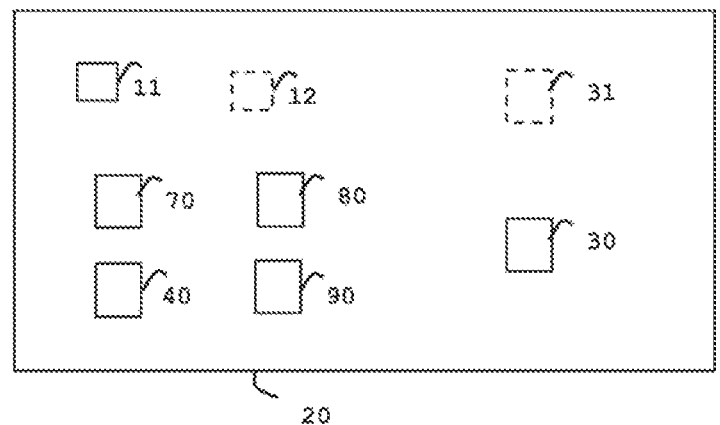
FIG. 2 shows a diagram of a secure element according to an example of the invention.

FIG. 2 shows an example a diagram of a secure element according to an example of the invention.

In this example, the secure element 20 is a smart card comprising a communication interface (not shown) configured to exchange data with the outside according to ISO-7816 standards.

Both the original operating system 30 and the updated operating system 31 comprise a JavaCard™ virtual machine VM.

The secure element 20 comprises an initial operating system 30 and an object which is represented by an instance 11 of a class. The secure element 20 comprises an upgrading agent 70 which is configured to generate an updated operating system 31 (shown in dotted line) by updating the initial operating system 30. The upgrading agent 70 is able to get a bulk of data coming from a distant machine and to update the original operating system 30 using the received data. For instance, the received bulk may comprise a patch for an existing function, an upgrade for a new feature or even a full operating system.

The secure element 20 comprises a keeper agent 90 adapted to create a metadata 40 that is uniquely associated with the object and comprising a value of a parameter of the class which has been used to create the instance 11. The keeper agent 90 is configured to permanently store the generated metadata 40 in the secure element 20.

For example, the following items characterize the Cipher class of JavaCard™ API:
The used cipher algorithm,
The multiple applet instances access,
The used key,
The mode (encrypt or decrypt).

All of the above-listed items are used for generating the metadata associated with a JavaCard™ object instantiated from the Cipher class.

Thus when an object is instantiated from the Cipher class, the created object contains a first part which is independent of the operating system and a second part which is operating system-dependent.

The second part includes element whose value is set according to the items used for generating the metadata.

The secure element 20 also comprises an instantiating agent 80 which is configured to re-instantiate an object by creating a new instance (like instance 12 shown in dotted line) of the class when the updated operating system 31 has been activated (or generated). The instantiating agent 80 creates the new class instance by using the metadata associated with the object. In particular, the instantiating agent 80 uses at least one value included in the metadata 40 to set a parameter of the class. The upgrading agent 70 is configured to trigger the re-instantiating step at the end of the updating of the initial operating system 30.

Preferably, the upgrading agent 70 is configured to automatically delete the previous class instances when new class instances are created during the re-instantiation step.

The keeper agent 90 may be configured to store metadata in a customized format different from the format used by class instance so as to minimize the footprint or to ease parsing of the metadata. Alternatively, the keeper agent 90 may be configured to store metadata in a format that is identical to the format used by class instance.

Figure 3:
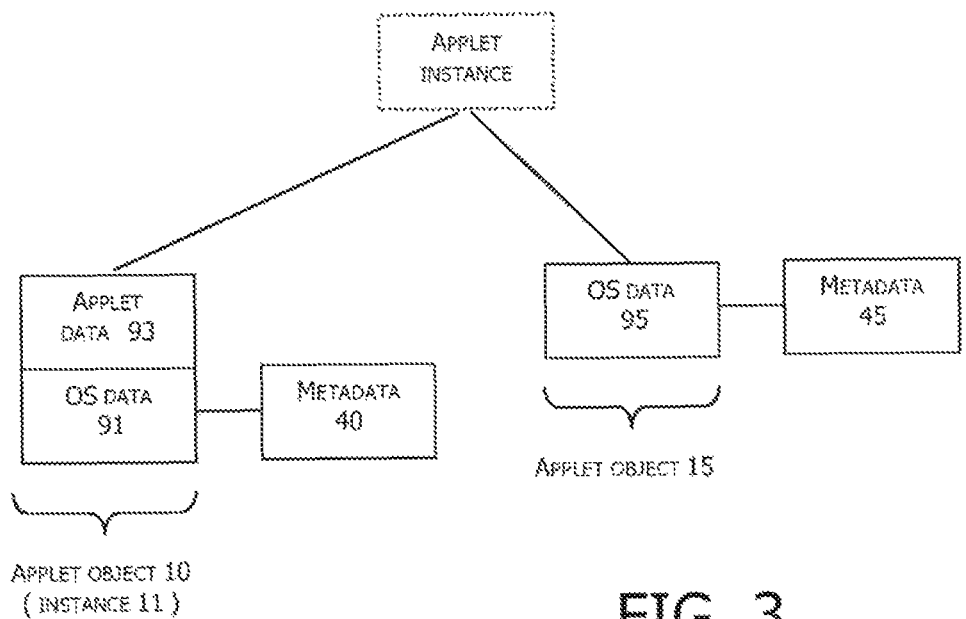
FIG. 3 shows an example of an application instance with an initial operating system according to the invention and FIG. 4 shows an example of an application instance with an upgraded operating system according to the invention.

FIG. 3 shows an example of an application instance with an initial operating system according to the invention.

At this stage, the initial operating system is still activated and an application instance (Applet instance) has been created in the secure element 20. In the example of FIG. 3, the application instance comprises two application objects 10 and 15.

The instance 11 of the object 10 includes a first part 93 (also named Applet data) and a second part 91 (also named OS data). Content of the first part 93 is independent from the current operating system. Content of the second part 91 is dependent of the current operating system. A metadata 40 has been created and uniquely associated with the second part 91.

The instance of the object 15 includes only a part 95 whose content is dependent of the current operating system. A metadata 45 has been created and uniquely associated with the part 95 (i.e. associated with the object 15 only).

Figure 4:
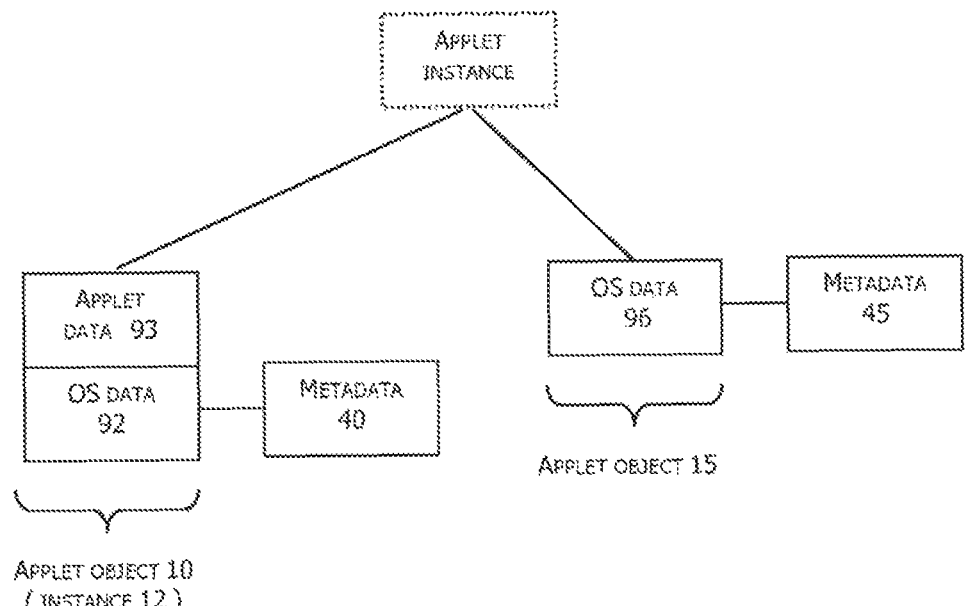

FIG. 4 shows an example of an application instance in the context of an upgraded operating system according to the invention.

At this stage, the initial operating system has been updated so that the current operating system is now the upgraded operating system. The application instance (Applet instance) has been kept under an updated form further to the re-instantiating operation in the secure element.

The class instance 11 of the object 10 has been replaced by a new class instance 12 which includes the first part 93 (remaining unchanged) and a new second part 92 whose content has been initialized using the metadata 40. The metadata 40 remains unchanged and is uniquely linked to the new second part 92. In other words, the metadata 40 remains linked to the object 10.

It is to be noted that the content of the first part 93 (also named group of data) is kept unchanged and is allocated to the updated class instance.

The class instance of the object 15 has been replaced by a new class instance (instance of the same class) which includes a single part 96 whose content has been initialized using the metadata 45. The metadata 45 remains unchanged and is still associated with the object 15.

The invention allows to keep active and functional applications based on objects embedded in a secure element when the operating system is updated. The invention avoids having to save data objects outside the secure element and to perform a complete cycle of application installation and application personalization.

Thanks to the invention it is possible to easily and smoothly manage the migration of existing objects when the operating system is updated, by automatically maintaining alive the objects already created in the secure element. Thus the updating operation of the operating system can be performed in a transparent way for the user who keeps a full continuity of service since the application instance (based on created objects) remain functional.

It is to be noted that metadata may be kept unchanged over successive evolutions of the operating system. The metadata may also be updated. In this case, the secure element 20 (e.g. the upgrading agent 70) should be configured to manage and ensure backwards compatibility.

The invention is not limited to the described embodiments or examples. In particular, the secure element may comprise several application instances whose objects are automatically re-instantiated as soon as the operating system is updated.

It is to be noted that the invention applies to any object represented by a class instance.

The invention claimed is:

1. A computer-implemented method for managing an object which is represented by a first instance of a class, said first instance being stored in a secure element comprising an initial operating system, said first instance comprising a set of data which are dependent on the initial operating system, the method comprising:
updating, by the secure element, the initial operating system to generate an updated operating system,
creating, by the secure element, a metadata uniquely associated with the set of data, said metadata being permanently stored in the secure element and comprising a value of at least one parameter of said class which has been used to create said first instance, and
re-instantiating, by the secure element, said object by:
determining whether the metadata is compatible with the updated operating system,
in response to determining that the metadata is compatible with the updated operating system,
generating a second instance of the class in the updated operating system by using said value to set said at least one parameter of the class, and
creating a new set of data which are dependent on the updated operating system, allocating said new set of data to the second instance and uniquely associating said metadata to the new set of data,
said second instance representing the object, and
wherein said re-instantiating step is automatically triggered by the step of updating the initial operating system.

2. The computer-implemented method according to claim 1, wherein said first instance comprises a group of data which are independent of the initial operating system and wherein the data of the group are kept unchanged and allocated to the second instance.

3. A secure element comprising:
a memory and a processor,
an initial operating system and an object which is represented by a first instance of a class,
an upgrading agent configured to generate an updated operating system by updating the initial operating system, said first instance comprising a set of data which are dependent on the initial operating system,
a keeper agent configured to create a metadata uniquely associated with the set of data and comprising a value of at least one parameter of the class which has been used to create said first instance, said keeper agent being adapted to permanently store the metadata in the secure element, and
an instantiating agent configured to re-instantiate the object by:
determining whether the metadata is compatible with the updated operating system,
in response to determining that the metadata is compatible with the updated operating system,
creating a second instance of the class in the updated operating system by using said value to set said at least one parameter of the class, and
creating a new set of data which are dependent on the updated operating system, allocating said new set of data to the second instance and uniquely associating said metadata to the new set of data,
wherein said upgrading agent is configured to trigger the re-instantiation at the end of the updating of the initial operating system.

4. The secure element according to claim 3, wherein said first instance comprises a group of data which are independent of the initial operating system and wherein the instantiating agent is configured to allocate the data of said group to the second instance while keeping said data of said group unchanged.

5. The secure element according to claim 3, wherein the keeper agent is configured to create and permanently store the metadata in a format different from that of the first instance.

* * * * *